United States Patent [19]
Houvener et al.

[11] Patent Number: 6,040,783
[45] Date of Patent: *Mar. 21, 2000

[54] SYSTEM AND METHOD FOR REMOTE, WIRELESS POSITIVE IDENTITY VERIFICATION

[75] Inventors: Robert C. Houvener, Nashua; Ian P. Hoenisch, Salem; Joseph Schappler, Bedford, all of N.H.

[73] Assignee: Image Data, LLC, Nashua, N.H.

[ * ] Notice: This patent is subject to a terminal disclaimer.

[21] Appl. No.: 08/966,520

[22] Filed: Nov. 10, 1997

Related U.S. Application Data

[63] Continuation-in-part of application No. 08/684,677, Jul. 19, 1996, Pat. No. 5,790,674, which is a continuation-in-part of application No. 08/436,146, May 8, 1995, Pat. No. 5,657,389.

[51] Int. Cl.[7] .................................................. G06F 7/04
[52] U.S. Cl. .................... 340/825.31; 380/24; 380/23; 382/115
[58] Field of Search ................... 340/825.34, 825.31; 380/23, 25, 24; 382/115; 235/380

[56] References Cited

U.S. PATENT DOCUMENTS

| | | | |
|---|---|---|---|
| 3,569,619 | 3/1971 | Simjian et al. | 178/6.8 |
| 3,711,833 | 1/1973 | Starkey | 340/149 |
| 4,156,911 | 5/1979 | Crane et al. | 364/419 |
| 4,858,121 | 8/1989 | Barber et al. | 364/406 |
| 4,991,205 | 2/1991 | Lemelson | 380/5 |
| 4,993,068 | 2/1991 | Piosenka et al. | 380/23 |
| 4,995,081 | 2/1991 | Leighton et al. | 380/23 |
| 5,053,608 | 10/1991 | Senanayake | 235/380 |
| 5,095,196 | 3/1992 | Miyata | 235/382 |
| 5,131,038 | 7/1992 | Puhl et al. | 380/23 |
| 5,224,173 | 6/1993 | Kuhns et al. | 382/2 |
| 5,259,025 | 11/1993 | Monroe et al. | 380/23 |
| 5,321,751 | 6/1994 | Ray et al. | 380/23 |
| 5,337,358 | 8/1994 | Axelrod et al. | 380/23 |
| 5,408,679 | 4/1995 | Masuda | 455/11.1 |
| 5,416,306 | 5/1995 | Imahata | 235/380 |
| 5,436,970 | 7/1995 | Ray et al. | 380/23 |
| 5,466,918 | 11/1995 | Ray et al. | 235/380 |
| 5,469,506 | 11/1995 | Berson et al. | 380/23 |
| 5,546,463 | 8/1996 | Caputo et al. | 380/25 |
| 5,790,674 | 8/1998 | Houvener et al. | 380/23 |
| 5,910,988 | 6/1999 | Ballard | 380/24 |

*Primary Examiner*—Michael Horabik
*Assistant Examiner*—Jean B. Jeanglaude
*Attorney, Agent, or Firm*—Bourque & Associates, P.A.

[57] ABSTRACT

Disclosed is a system and method of providing system integrity and positive audit capabilities to a positive identification system. The use of access authority information units to gain access to the positive identification system solves the problems of open, unsecured and unauditable access to data for use in point of use identification systems and enables the system to be implemented in a mobile embodiment, which would expand system uses to applications using wireless communications links between the point of identification terminal and a remote identification database. In order to secure the rights to the data that is needed to make mass identification systems operate, it must be shown that records will be closed and secure, as well as that there will be an audit trail of access that is made to the data. This system solves those problems through the use of a system and method for identification with biometric data and/or personal identification numbers and/or personalized devices embedded with codes unique to their assigned users.

9 Claims, 10 Drawing Sheets

SYSTEM AND METHOD FOR REMOTE, WIRELESS POSITIVE IDENTITY VERIFICATION

RELATED APPLICATION

This is a Continuation-in-Part of application Ser. No. 08/684,677 filed Jul. 19, 1996, now U.S. Pat. No. 5,790,674, issue Aug. 4, 1998, which is a Continuation-in-Part of application Ser. No. 08/436,146, filed May 8, 1995, now U.S. Pat. No. 5,657,389, issued Aug. 12, 1997.

FIELD OF THE INVENTION

The present invention relates to the field of identity verification. Specifically, the invention is directed to a system and method of providing system integrity and positive audit capabilities to a positive identification system, which is especially beneficial for use with wireless, portable positive identity verification terminals. More particularly, the system and the method utilizes personal identification numbers (PINs) to limit access to the identification related devices to personnel who are authorized to do so. The PINs can be implemented as a simple number that can be typed into an input keypad when access to the positive identification system is desired. A more robust implementation of the PIN system is implemented as a portable storage device or electronic key that holds a readable code which is associated with an authorized user of the positive identification system. Finally, either PIN implementation, or both, can be used in identification of the system user at the point of verification terminal.

BACKGROUND OF THE INVENTION

Positive identity verification is critical in many type of transactions and security procedures. For example, signatures, fingerprints or images of faces are compared to establish identity. Creation of fraudulent identities or the misrepresentation of an individual's identity can result in fraudulent transactions and the breach of security systems. At present, such positive identification means as driver's licenses, picture identification cards, hand-written signatures, personal identification numbers, fingerprints, retinal scans, voice prints and other ways of uniquely identifying personal characteristics are used. However, these prior art methods of identity verification exhibit one or more of the following deficiencies: 1) they do not offer sufficient reliability for most positive personal identification applications; 1) the technology required for their implementation is too expensive for wholesale adoption by entire industries; 3) they do not offer ease of use, which is critical for most applications of personal identification; 4) the technology required to implement them in a wide-scale manner is not yet mature enough to guarantee sufficient reliability; 5) the recurring cost of using technology is too high for most applications of personal identification; 6) the data used for identity verification is not maintained in a secure manner and is almost universally held by the person presenting it as the form of verification, thereby allowing for fraudulent alteration of the verification data; 7) processes for building accurate verification databases for wide-spread use are impractical; and 8) the process of verification does not include sufficient steps to ensure that the individual responsible for identity verification is accountable to ensure that identity verification is accurately performed.

One system which relies on positive identity verification for transaction is the credit/debit and charge card system. Credit cards are an increasingly popular means for consumers to complete transactions. However, part of the costs incurred for the convenience of using credit cards is the burgeoning growth of credit card fraud. Because there are trillions of dollars of credit card transactions made each year, which depend on the fact that the person presenting the form of payment is actually the person having the legal right to use the underlying account, even a small percentage of fraudulent transactions results in billions of lost dollars. The cost of this fraud is paid for, indirectly, by consumers in the form of higher credit card interest rates and fees and, in part, by merchants accepting such credit cards in the form of higher transaction commissions.

Methods used to combat fraud have been the use of holographic images on cards, the need for a validation requester to obtain transaction approval, the encoding of cardholder information on magnetic strips on the back of the card, as well as signature verification. A number of patents have issued on identification devices and methods. Of particular note is U.S. Pat. No. 5,321,751, issued to Ray, et al. on Jun. 14, 1994. Other prior art references of note are U.S. Pat. No. 5,337,358, issued to Axelrod, et al. on Aug. 9, 1994, U.S. Pat. No. 5,095,196, issued to Miyata on Mar. 10, 1992, U.S. Pat. No. 5,259,025, issued to Monroe, et al. on Nov. 2, 1993, U.S. Pat. No. 4,995,081, issued to Leighton, et al. on Feb. 19, 1991, U.S. Pat. No. 4,991,205, issued to Lemelson on Feb. 5, 1991, U.S. Pat. No. 5,053,608, issued to Senanayake on Oct. 1, 1991, U.S. Pat. No. 5,131,038, issued to Puhi, et al. on Jul. 14, 1992 and U.S. Pat. No. 4,993,068, issued to Piosenka, et al. on Feb. 12, 1991. As noted above, one of the underlying deficiencies of all of these prior art identification systems is that they all rely, in some manner, on information encoded on the credit card being presented. While some of these references include sophisticated encryption algorithms, the fact remains that giving access to the information to the card users lends itself to the potential for reverse engineering and overcoming even the most sophisticated of encryption means.

In recent past, Citibank introduces a credit card with a digital likeness of the authorized user provided on the card itself. As the Ray patent discloses, the photographic image on the Citibank card resulted in an initial drop in fraud in the New York test market estimated as high as 67 percent. However, as Ray also explains, the Citibank photo card system, like other forms of identity verification that are distributed to the public, will eventually be defeated by sophisticated counterfeiting.

An additional difficulty with most prior art verification methods is that they all require the use of a special credit card incorporating some form of identification means. Thus, in order for their use to gain widespread acceptance, replacement of existing credit cards and credit manufacturing equipment must be accomplished.

The disclosed invention offers a number of advances over prior art identity verification systems and methods, which overcome many of the limitations found in such prior art systems. The first, and perhaps the most significant advantage of the disclosed invention is that the positive identity verification system stores the verification data at a remote site and thereby does not give criminals access to the identity verification medium. This is significant in that any time a potential counterfeiter is afforded the opportunity to access the verification medium, there is the potential that the medium can be corrupted, regardless of the level of security sophistication incorporated into the system. A second, and again significant advantage of the disclosed invention is that the system is completely independent of the credit cards whose users the system designed to positively identify.

Thus, the disclosed invention does not require the modification or replacement of existing credit cards, which would be an almost insurmountable task. Furthermore, the segregation of the identity verification medium from the credit cards themselves allows the system disclosed herein to be used in conjunction with any number of credit cards.

SUMMARY OF THE INVENTION

The present invention is a system and method of positively identifying individuals. The system comprises a point of identification terminal having a means for inputting data presented by a particular individual, at least one database storage and retrieval site having stored therein a plurality of digital image data unique for persons to be identified, and a means for exchanging data between the point of identification terminal and the database site. The database site comprises a means of validating that a point of identification terminal seeking to exchange data with the site is authorized to do so. The database site also comprises a means for validating that a system user is authorized to access the database before access is granted. At the database site, the system receives the information presented at the point of identification terminal and searches the database to find the unique image data corresponding to the unique data. The system then transmits the image data to the point of identification terminal where it is displayed on a display means. Finally, the system incorporates a means for verifying that an identifier present at the point of verification has adequately verified that the digital image displayed on the display means matches physical or biometric information provided by the person to be identified at the point of identification terminal.

DESCRIPTION OF THE DRAWINGS

These and other features and advantages of the present invention will be better understood by reading the following detailed description, taken together with the drawings wherein:

FIG. 2 is a perspective view of the preferred embodiment of the point of identification terminal, which would be available for use at a point of sale or the like.

Figure 1:
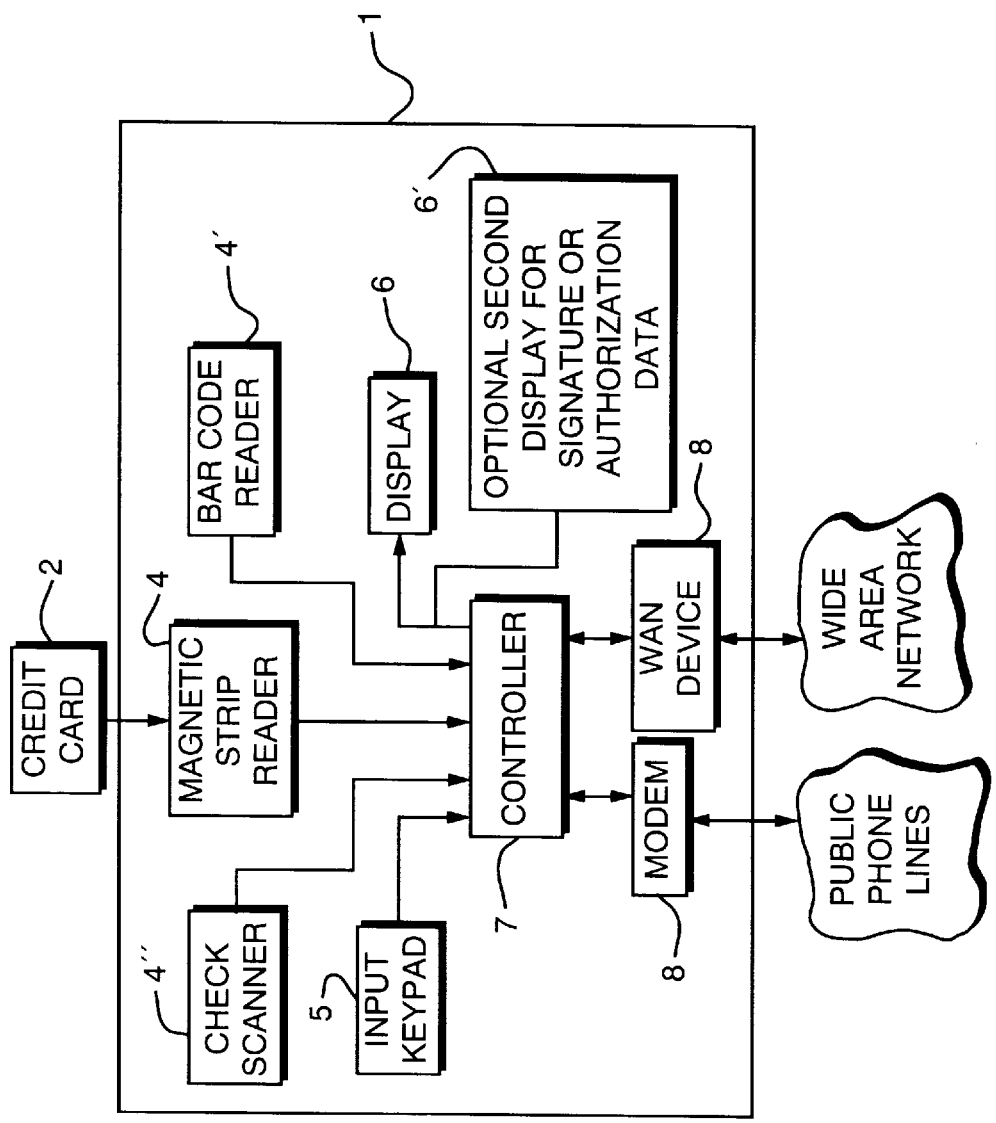
FIG. 1 is a block diagram of a point of identification terminal showing the various components contained therein.
Figure 2:
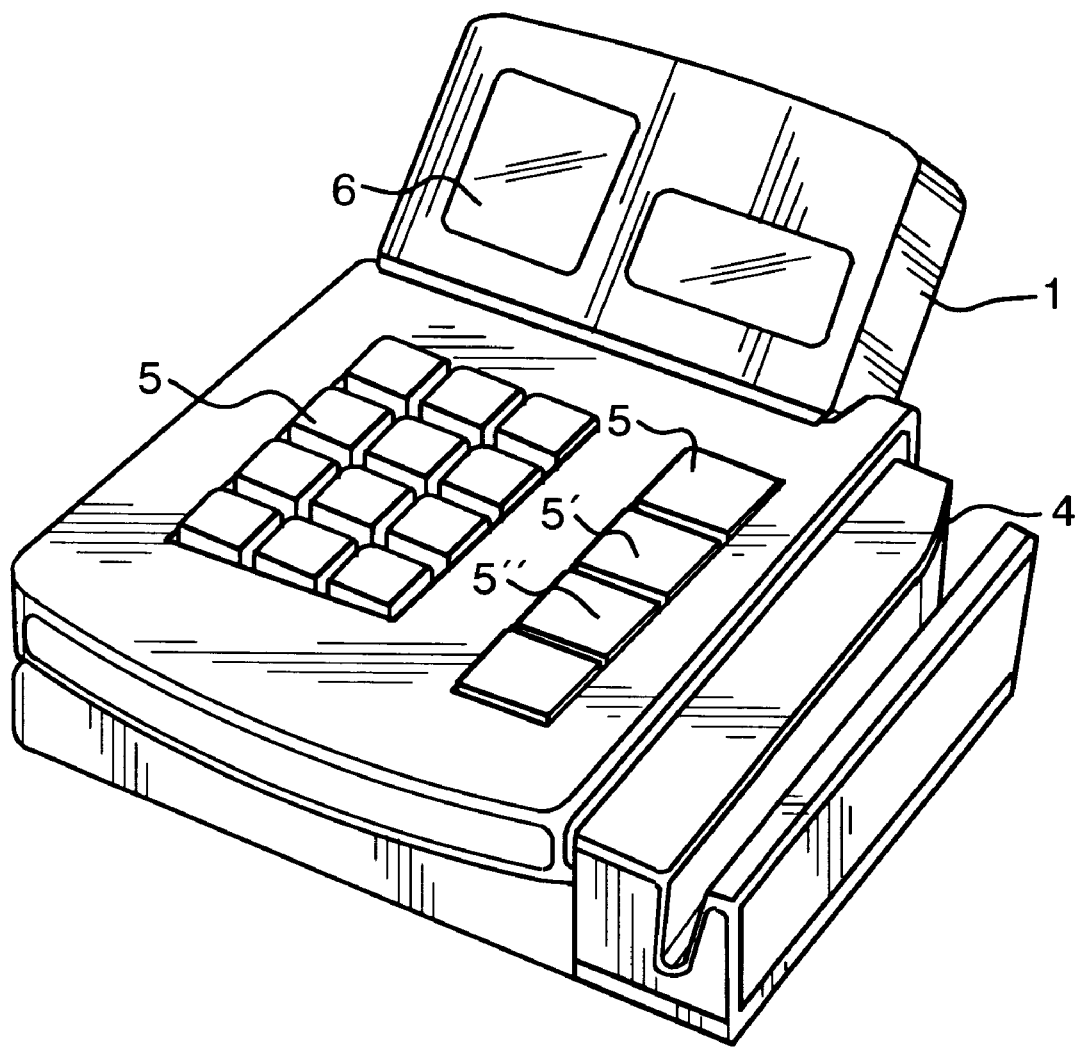
Figure 3:
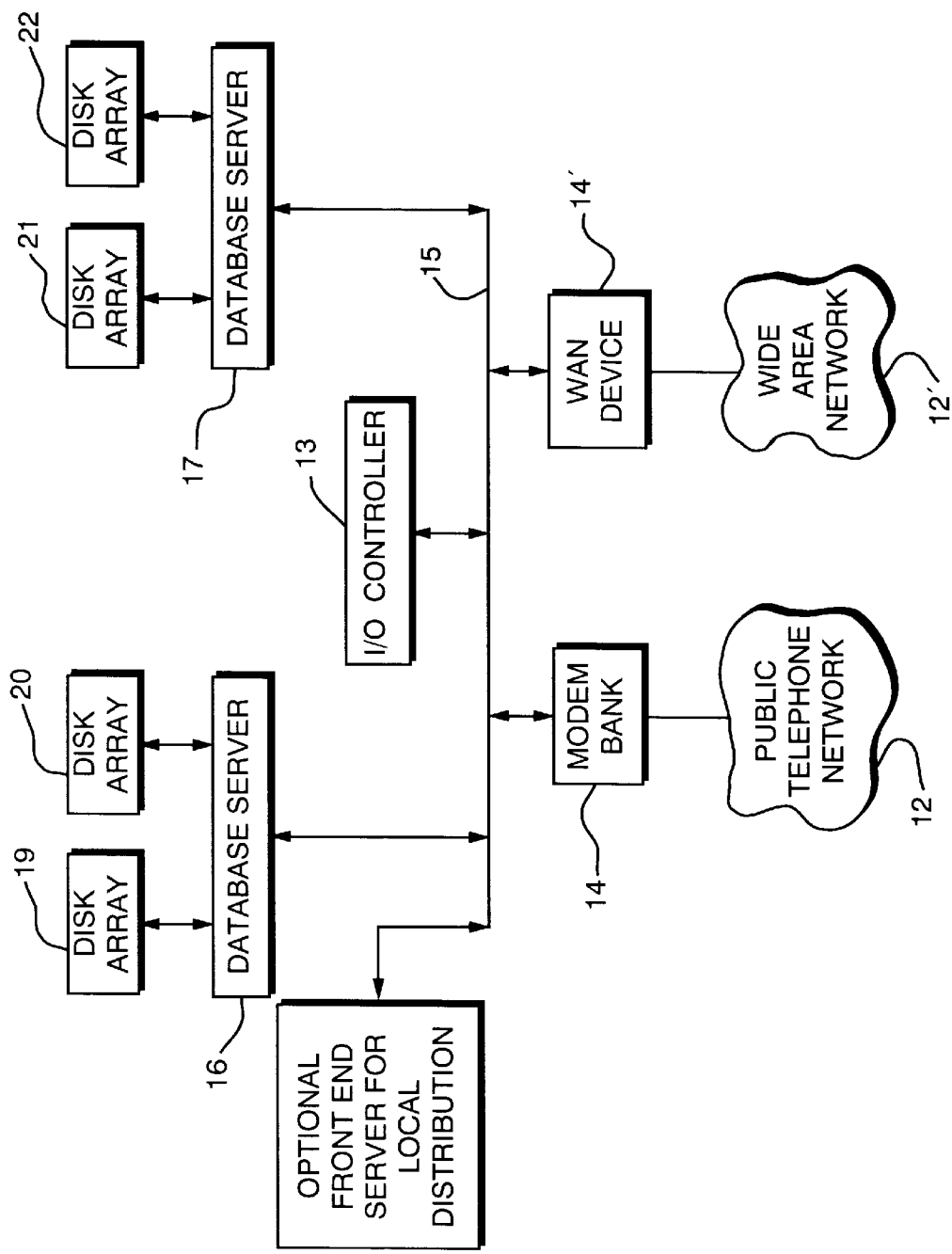
FIG. 3 is a block diagram of components of a positive identification system and the communication flowpath established between the point of identity verification and the remote database storage and retrieval center, which is where a comprehensive database of photographic images of persons to be identified is maintained and accessed for transmission to the point of identification.
Figure 4:
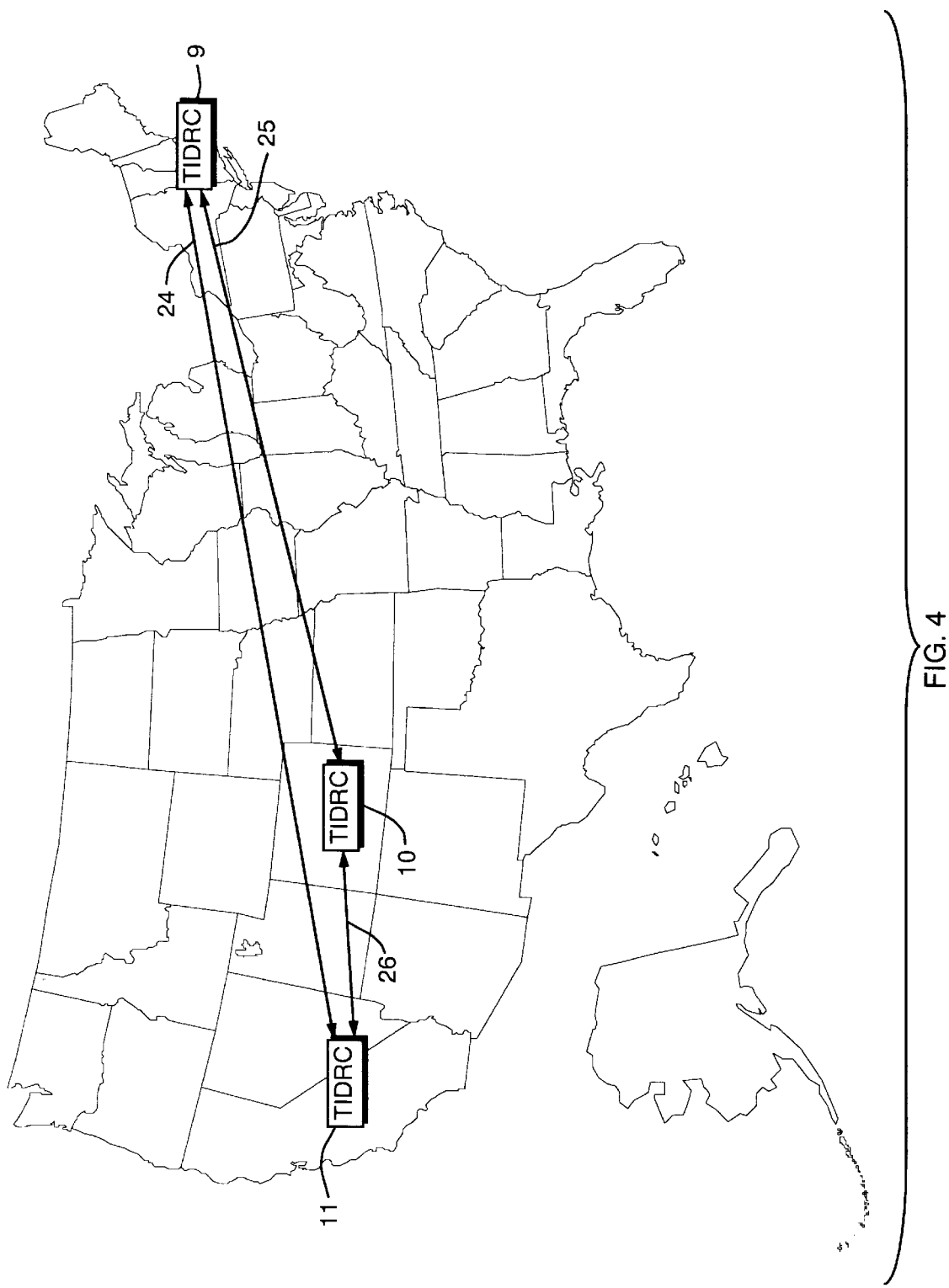
FIG. 4 is an upper level system architecture drawing showing a number of database storage and retrieval centers networked over a global high speed network.

These and other features and advantages of the present invention will be better understood by reading the following detailed description, taken together with the drawings wherein:

DETAILED DESCRIPTION OF THE PREFERRED EMBODIMENT

The present invention is a system and method to develop, maintain and use a secure and authentic database of digital photographic images, signature or other data unique to individuals for positive identification purposes. The system includes a means for accessing the database in a secure and cost-effective manner, a means for performing positive identity verification, and a distributed database update and retrieval system, which allows for low cost operation, ease of use, stability and robustness for vase numbers of verification requests originating from worldwide locations. The present invention also includes a means that allows for accountability on the part of the user of the system, which in turn will ensure that the system is used to its fullest potential.

The system will first be disclosed herein with a particular references to a point of sale system, where a credit card is presented by a consumer, or presenter, in order to make a purchase. Thus, the disclosure will make particular references to credit card account numbers, and the like. However, it is understood that the positive identity verification system disclosed herein is adaptable to any application where positive identity verification of a person is required. Such alternative applications comprise checking and banking transactions, firearms sales, food stamp reimbursement and a host of other applications related to the welfare, voting, law enforcement, health care, airline, immigration and naturalization fields. Many of these applications would benefit from a wireless, portable positive identification terminal, which will also be discussed herein.

Referring now to the figures, a positive identification system in accordance with the disclosed invention is shown. A point of identification terminal 1 is located at a location where the identity of persons present is required to be verified. The point of identification terminal comprises a standard magnetic strip reader 4, an optional bar code reader 4', a check scanner 4", all of which are well known in the art, an input keypad 5, a display means 6, which is preferably a miniature flat panel display, a controller 7, and an internal communication modem or other communication means 8. A wireless, mobile identification terminal 1' can be carried by an individual whose assigned duties include positive identity verification of individuals for use as the need arises. Like a hard-wired point of identification and terminal, the wireless, mobile identification terminal 1' comprises a standard magnetic strip reader 4 and can have an optional barcode scanner 4', all of which are well known in the art. The mobile identity verification terminal also comprises an input keypad 5, a display means 6, which is preferably a miniature flat panel display, a controller 7, an internal communications modem 8 and a wireless transceiver 8'. The wireless transceiver is used to link the mobile identification terminal to a remote database site using cellular communication protocols or other wireless communications means, which would be selected to provide a level of security acceptable to the system. Although the rate of data exchange may vary depending on the availability of quality phone lines or other means of data transmission, such as a dedicated wide area network or a satellite communication link, the system would preferably transmit data at a rate of at least 9,600 baud per second (bps). However, quality data transmission media will allow for the data exchange at rates of 14,400 bps, 28,800 bps or even higher baud rates.

In credit card transactional situation, the point of identification would be the point of sale, which typically incorporates a cash register and prior art credit card verification systems. Upon presentation of a standard credit card 2, the store clerk or other individual responsible for positive identification would input the credit card account number into the point of identification terminal 1. The preferred method of inputting the credit card information would be by swiping the credit card through the standard magnetic strip reader 4. The magnetic strip reader 4 would read credit card account information, which is currently encoded on magnetic strips on the reverse side of virtually all credit cards. In the alternative, if the magnetic strip containing the account data is corrupted, which routinely occurs due to either wear or contact with a powerful magnetic field, the identifier would simply read the account number off of the credit card, where it is typically provided in embossed characters, and input the credit card account number into the point of identification terminal using keypad 5. Another alternate means of inputting the credit card account information into the point of verification would be to utilize a coded medium such as a bar code. In this embodiment, the magnetic strip reader 4 would be replaced by a standard bar code reader to transfer its data to the code reader 4' and onto controller 7.

Another embodiment of the invention would include check scanner 4", which would be used to scan checking account number information off a standard personal or company check, which would expand the role of the system from credit/debit card transaction identity verification to checking related transactions as well.

In addition to the credit card account information, the identifier could manually input any other information needed to aide in the identity verification process via keypad 5. Such additional information could be whether the presenter is male or female, in which case the keypad could incorporate a specific key to correspond to the male - female choice 5' or whether the presenter is a dependent of the credit card owner, in which case the keypad would incorporate a specific key 5" to correspond to dependent choice.

Once the account number is entered into the point of identification terminal 3, the terminal would initiate communications via its internal communication means, which could be a modem, wide area network (WAN) device or in the case of a wireless mobile identity verification terminal, a wireless communications transceiver 8 to one of a number of remote database storage sites 9–11. Acceptable forms of communications links include public phone lines 12, satellite communication, dedicated network means 12' or wireless communications media such as analog or digital cellular telephone systems. The actual site accessed would be a function of availability and loading on the public access phone lines, network availability, retrieval site availability or other system availability criteria at the time the terminal initiates communication with a remote database site. Communications will then be established with an input/output controller 13 at the remote database storage site through a modem bank 14 at the database storage site, the controller 13 would initiate a query to the point of identification terminal 3 to verify that the terminal has the appropriate authority to access the remote database site and is a valid device. One simple and cost effective method of performing this query is to use commonly available caller ID technology to ensure that the request for data has originated from an authorized telephone line. Additionally, a software key may be incorporated into each point of identification terminal which will respond in a predetermined manner when queried by a remote database storage site.

Once controller 13 verifies that the requesting point of identification terminal 1 is a valid device and has the appropriate access privilege, the terminal will be allowed to transmit and information request to the database storage site. The information request is also received by input/output controller 14, over a high speed network 15. The high speed network may be fiber distributed data interface (FDDI), asynchronous transfer mode (ATM) or any other suitable cost effective high speed network. The information request is then routed to one of a number of database servers 16–17 where the credit card account data is processed. The selected server then accesses a set of high speed, high reliability disk arrays 19–22 and retrieves the digital photographic or other image or other unique personal data associated with the account data received by the database server.

In addition to retrieving the digital image or other unique personal data stored at the remote database site, the database site would be configured to allow input/output controller 13 to initiate additional information requests from outside information databases. One such scenario envisioned in the credit card processing example would be for the database site to query any one of a number of existing credit authorization agencies (CAA) to verify that the credit card account being processed is valid and within its pre-approval credit limit. An alternate embodiment would be to have the remote database storage and retrieval site(s) co-located at a one or more CAA sites. In a law enforcement scenario, the database site may be linked to law enforcement databases for drivers and/or criminal records.

The identifier, which would be the sales clerk in a retail establishment, would only need to input the credit card information into one device and would receive both credit approval and identification information from a single source. In this scenario, input/output controller 13 would initiate a credit authorization request to and outside CAA 23 through modem bank 14 over public access telephone lines 12 or through a WAN connection 14' or the like. If the amount of the transaction is approved by the CAA 23, the database site would receive the credit approval code from the CAA and retransmit the code to the point of verification terminal along with the digital image information or other unique data over its established communications link. The credit approval code would be displayed either on the display means 6 of the point of verification terminal or, in the alternative, on an optional second display means 6'.

The point of identification terminal would then receive the information via modem WAN or wireless connection 8 and route it to controller 7, which would process the information received and display the digital image received on display means 6. In one embodiment of the invention, the digital information would be stored at the remote database storage site in a compressed state and would be transmitted to the point of identification terminal in the compressed state so as to minimize the time associated with a particular transaction. In this embodiment, the controller 7 would first decompress the digital photographic information and then display the information on display means 6.

Another embodiment of the invention, which would be used for situations where the highest security of information would be required, such as when a wireless, mobile identity verification terminal accesses the remote database site over cellular telephone links, the digital image information would be encrypted in addition to being compressed for transmission to the point of verification terminal. In this embodiment, the terminal controller 7 would be required to decrypt as well as decompress the photographic information in order to allow the information to be displayed on the display means.

Once the identification information is displayed at the point of identification terminal, the store clerk, or other person responsible for identity verification, would visually compare the image displayed on the display means with the physical appearance or the signature of the person presenting the credit card at the point of verification. If a match exists, then the clerk would input a specified key or keystroke sequence on input keypad 5 to indicate that the clerk in fact verified that an identity match exists.

Figure 5:
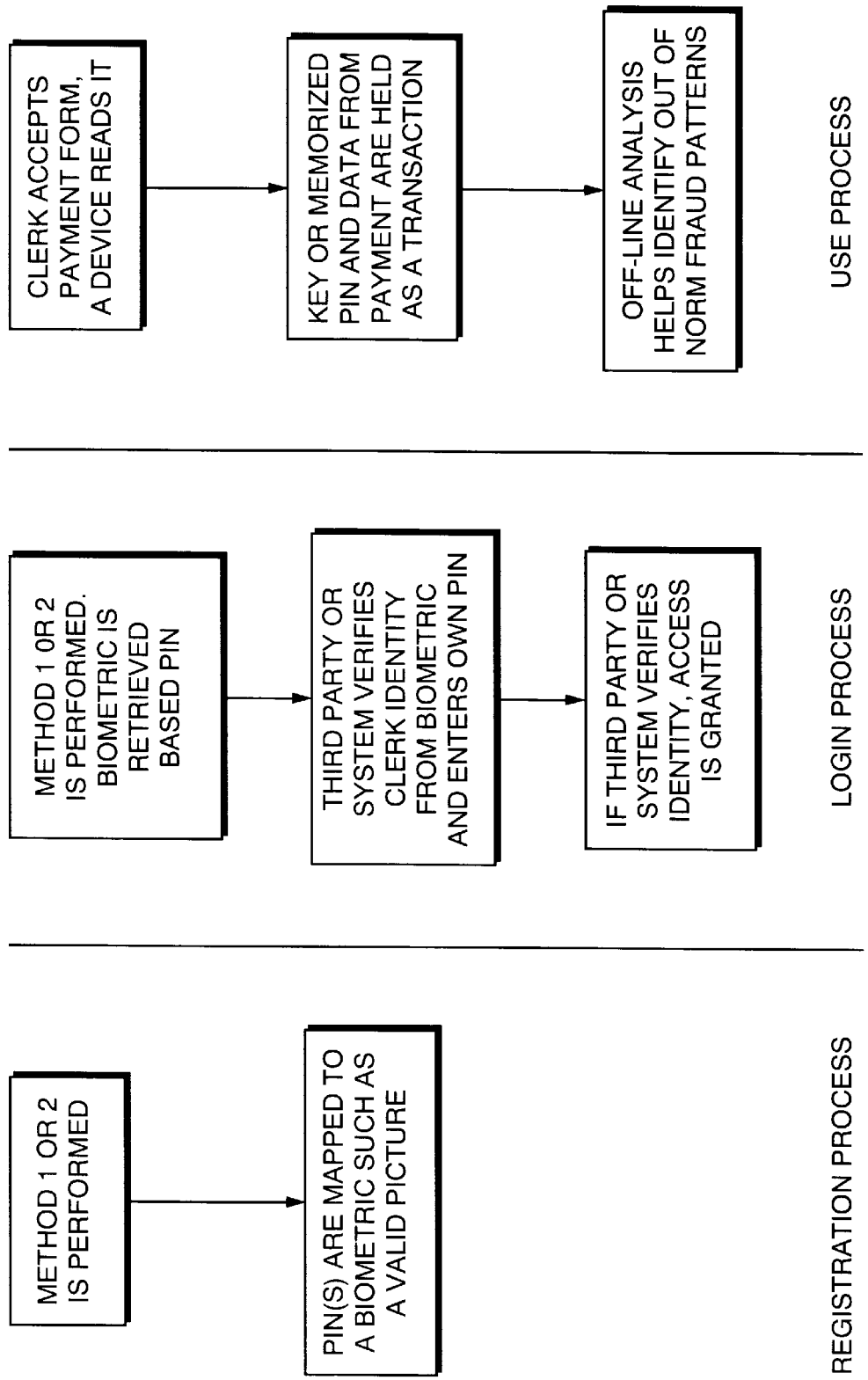
FIG. 5 is a block diagram showing a method for providing auditing capabilities and system integrity for a positive identification system and method by requiring an individual verifying the identity of a person presenting a credit card or the like at a point of identification to input a memorized personal identification number (PIN) into the positive identification terminal for each transaction.

FIG. 5 shows the positive identification sequence using a memorized personal identification number (PIN) for each individual tasked with verifying the identity of a person (an "identifier"). First each identifier is assigned a unique PIN, which each identifier must memorize. The PIN serves as an access authority information unit, which will allow only authorized users to access the remote database site. Each memorized PIN would then be mapped by the positive identification system to a single user in the secure database located at the remote database site. When a user logs into a point of identification terminal in order to access the information maintained in the remote database, the user will enter his or her access authority information unit into the point of identification terminal. The positive identification system will then compare the memorized PIN that is entered into the system to determine if a match exists with a PIN assigned to a valid database user. If a match exists, then access is granted. If no match exists, then access is denied.

Once access is granted, the clerk is free to accept a form of payment from a person to be identified, such as a credit card, a check or the like. Upon receipt of the form of payment, the clerk inputs the account information into the point of identification terminal and the positive identification process continues as described above. The remote database site will store the users PIN and the data from the specific transaction as a transaction record. Thus, if there is ever a question as to the veracity of the identification process, the system can recreate a transaction and identify not only the person initiating the transaction but the clerk who was responsible for positively identifying the individual initiated the transaction. In addition, the system could be configured to incorporate an off-line fraud detection routine to monitor transaction patterns in order to identify out of norm fraud patterns. An example of such a routine would be for the system to note the time differential between transactions authorized by a specific PIN and decide if it would be unlikely for the individual assigned to the specific PIN to have physically moved between the different point of identification terminals in order to have authorized the transactions. For instance, if the same PIN were forwarded to the remote database site from different point of identification terminals at different locations at nearly the same time, the system could highlight the transactions as being potentially fraudulent and thus requiring additional investigation.

Figure 6:
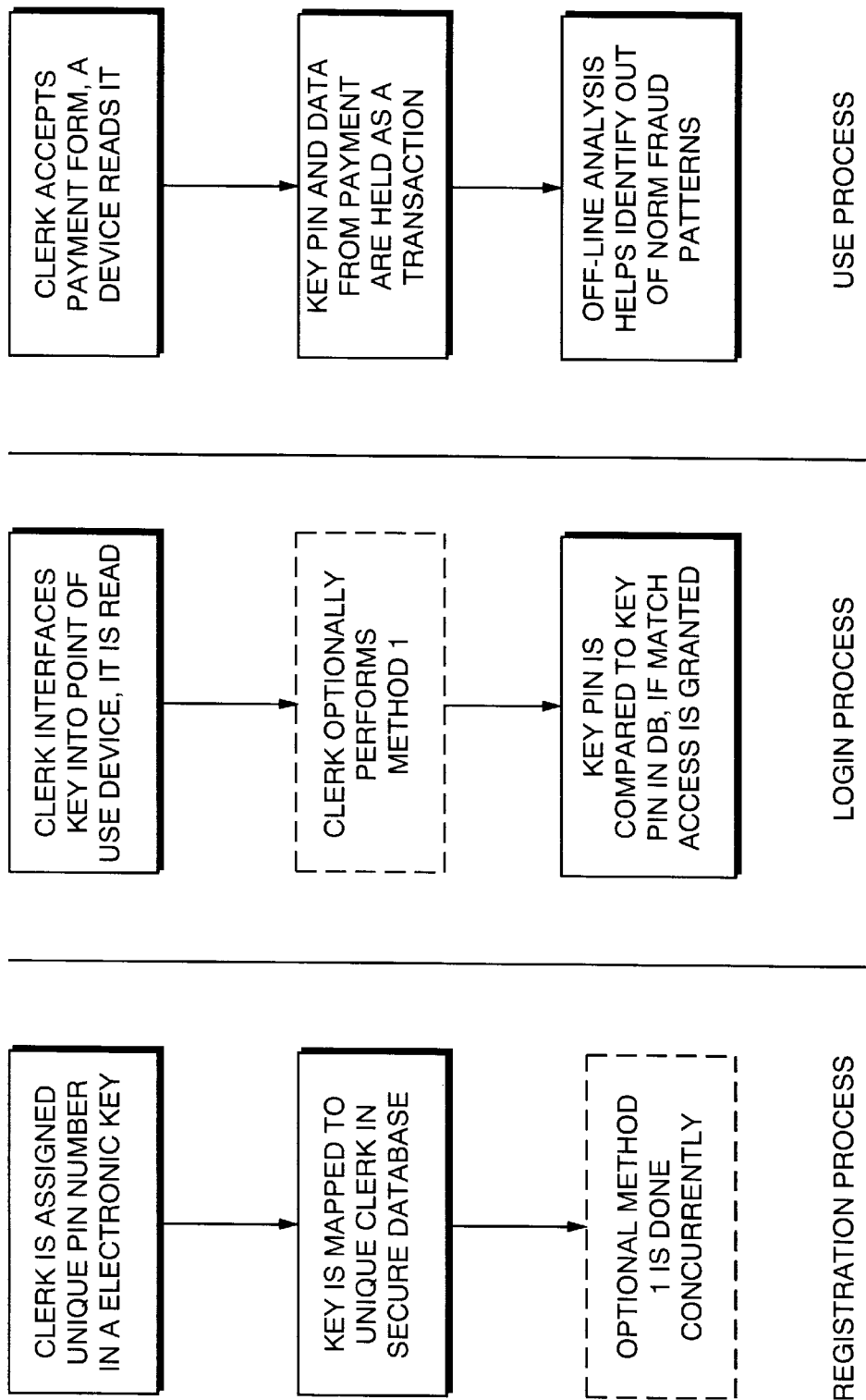
FIG. 6 is a block diagram showing a method for providing auditing capabilities and system integrity for a positive identification system and method using an electronic key based PIN and an optional memorized PIN.

FIG. 6 shows a more robust implementation of the PIN system. In this implementation, the access authority information unit is a unique PIN, which is implemented as a portable storage device or electronic key. The electronic key is embedded with a readable code that is associated with a specific system user e.g. a store clerk or other individual who is tasked with identity verification duties. Each such user is thus assigned an electronic key. The readable code embodied in the key is then mapped to its associated user in the remote database. Optionally, each user can be assigned a unique PIN to memorize as well. This would provide a redundant method of ensuring access to the remote database is only granted to authorized individuals.

The log-in process for this implementation would require a user to interface his or her electronic key into the point of identification terminal, which would then read the code embedded in the electronic key. Optionally, the user could also be required to enter his of her memorized PIN via the keypad on the point of identification terminal. The remote database site would then compare the PIN read from the embedded electronic key and, if applicable, the memorized PIN entered into the terminal to the database of authorized users maintained in the secure database. If a match exists, then access will be granted. If either or both of the access authority information units does not match, then access will be denied.

Once access is granted the user would then accept a form of payment in much the same manners as described above with respect to the memorized PIN access implementation. Again, the system could incorporate off-line analysis routines to help identify out-of-norm fraud patterns.

Figure 7:
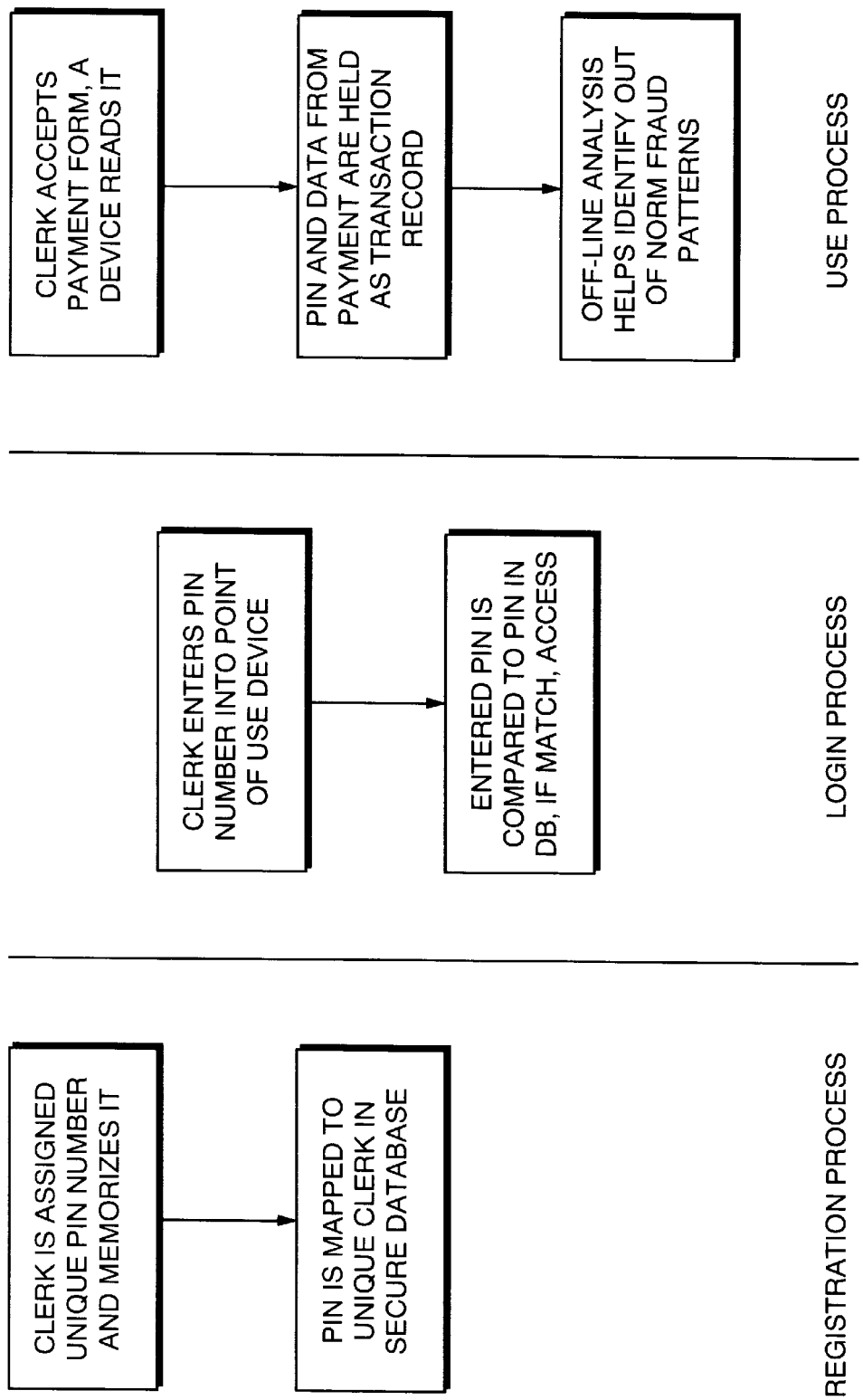
FIG. 7 is a block diagram showing a method for providing auditing capabilities and system integrity for a positive identification system and methods using a biometric with either an electronic key based PIN, a memorized PIN or both.

Yet another implementation to provide accountability and system integrity is shown in FIG. 7. In this implementation a biometric, such as a picture, of each person authorized to access the system is mapped to either an electronic key-based PIN system, memorized PIN system of both. The registration process for this implementation system would be similar to either of the previously described methods except that each access authority information unit assigned by the system would be mapped to a biometric, such as a valid picture, associated with specific system user. In this scenario, the login process would require the input by a system user, of either his or her electronic key-based PIN, his or her memorized PIN or both. The remote database would then retrieve the biometric associated with the PIN input into the system. A third party, such as a manager, or other individual acting in a supervisory role would then verify the identity of the particular clerk from the biometric provided to the point of verification terminal. The manager would then be required to enter his or her own access authority information unit, which the system would then accept and map to the particular user verification transaction. Once the identity of the system user is verified by the third party, then access to the system would be granted. Thus, redundancy of system user identification would help preclude access to the remote database by other than authorized system users. In the alternative, a more sophisticated embodiment of the system could incorporate an automatic biometric comparator which would replace the supervisor or other third party verification procedure.

As with both embodiments described above, the use of the positive identification system incorporating this user verification strategy would require the user to accept a form of payment from an individual to be identified, input the payment information into the system, verify the identity of the person presenting the form of payment and acknowledging that a match exists between the person physically presenting the form of payment and the person's picture that is displayed at the point of verification terminal. The system would store the information as a transaction record and could incorporate off-line fraud detection routines as well.

Thus, the above described systems of using access authority information units to gain access to the positive identification system would solve the problems associated with open, unsecured and unauditable access to data for use in the point of use identification systems.

Figure 8:
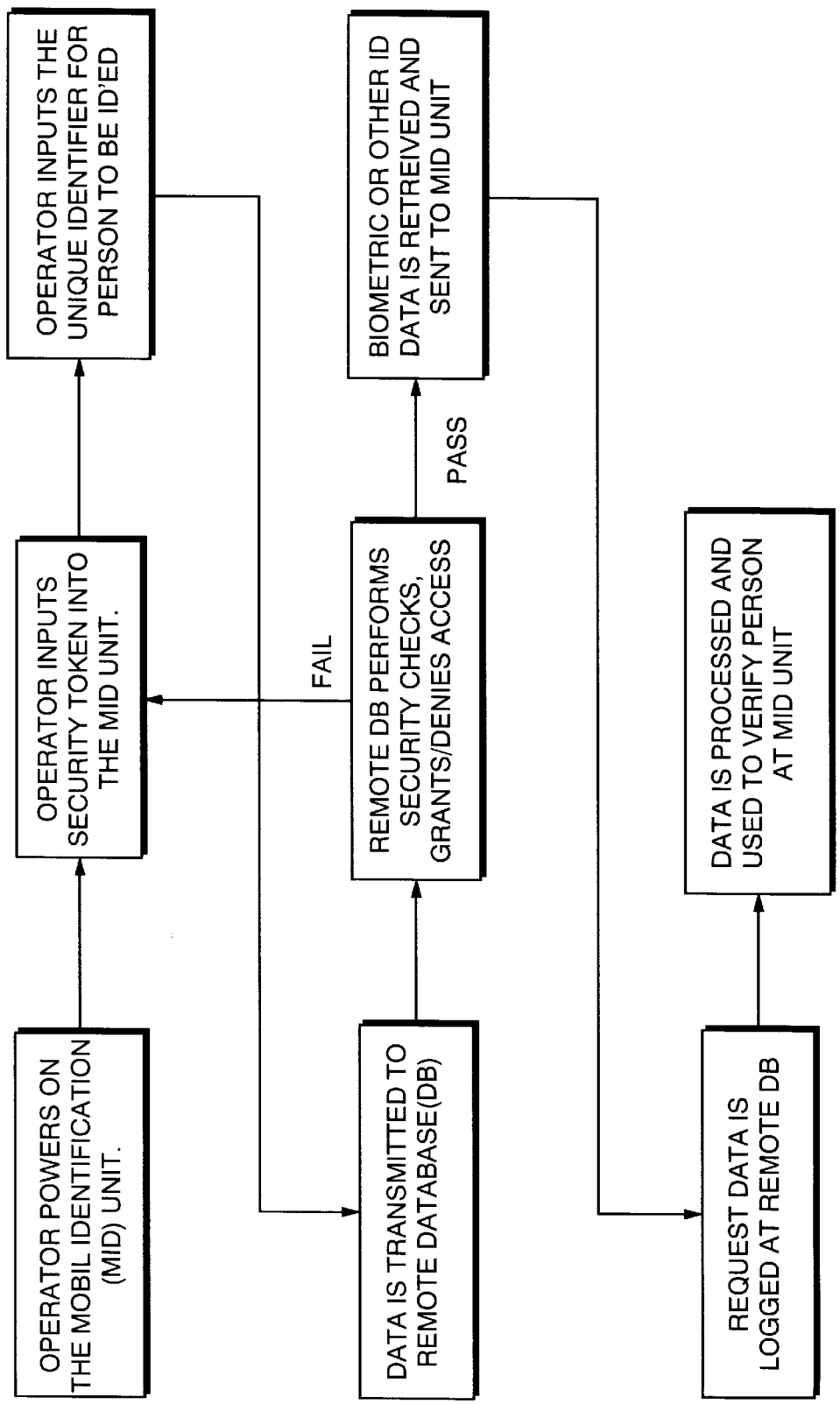
FIG. 8 is a block diagram showing a method for positive identification using mobile identification unit.
Figure 9:
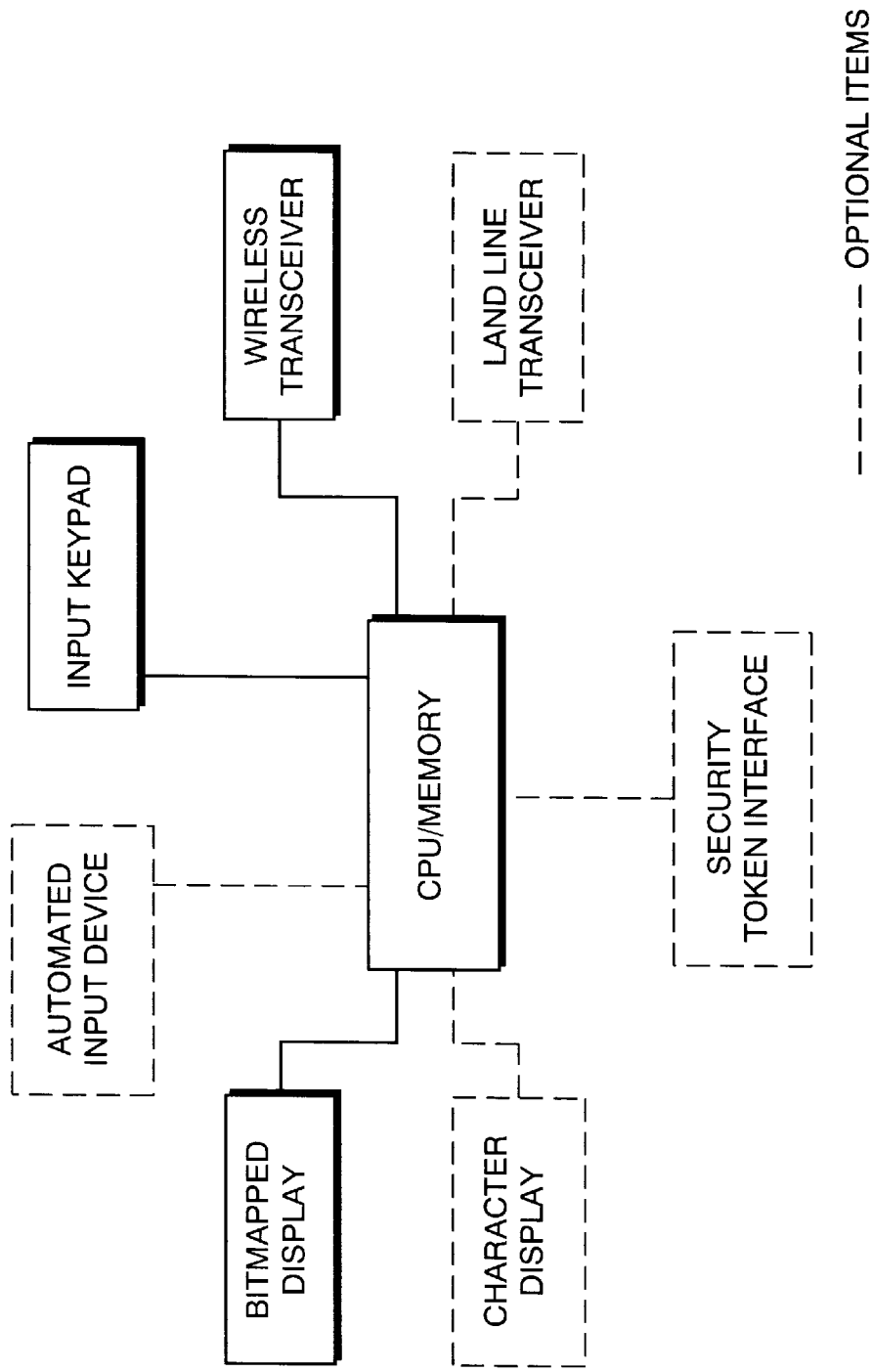
FIG. 9 is a block diagram showing the components of a mobile identification unit.
Figure 10:
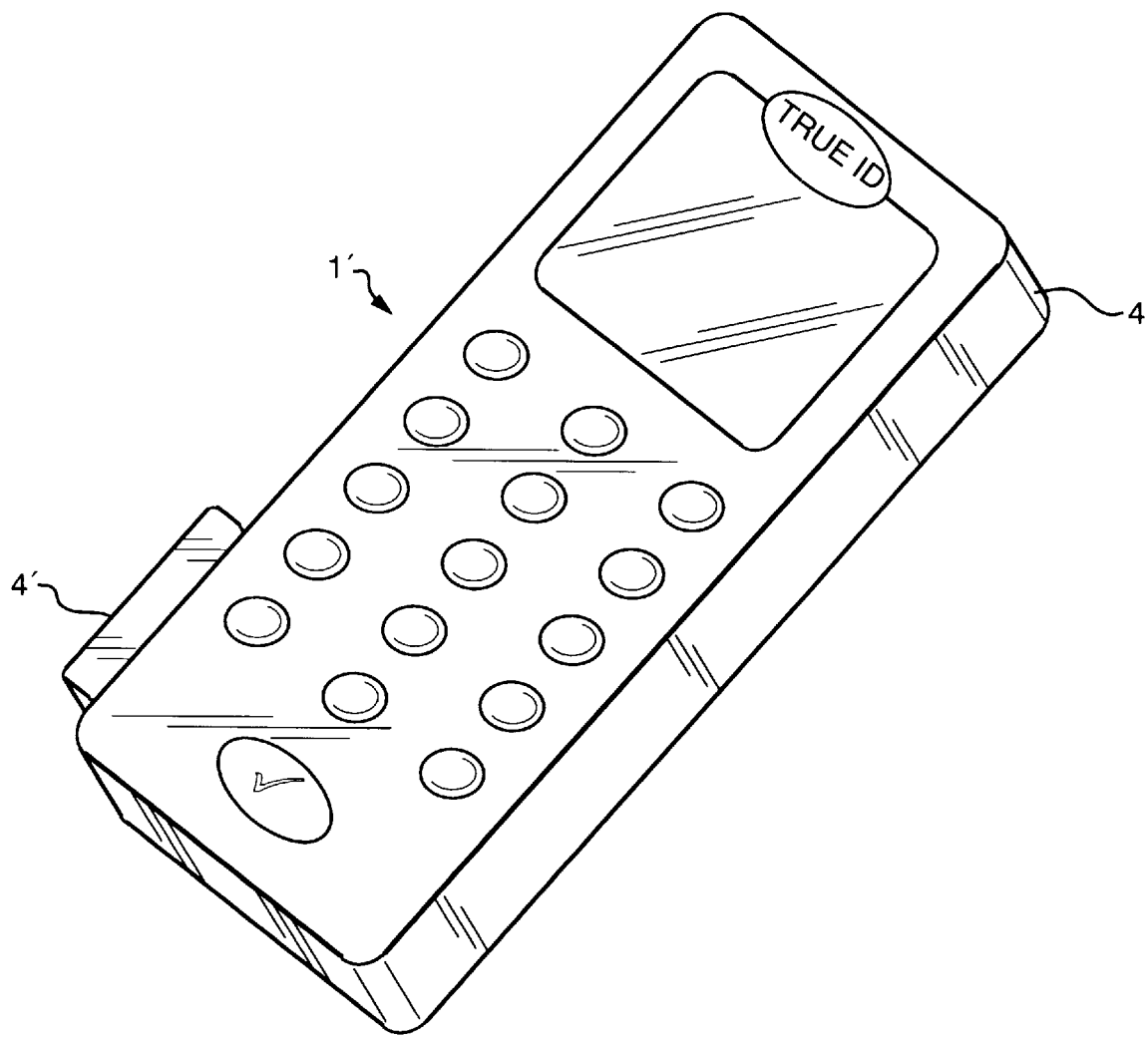
FIG. 10 is a perspective view of a preferred embodiment of a mobile identity verification terminal.

A method for positive identification via a mobile identification terminal is shown in FIG. 8. In this scenario an operator responsible for verifying the identity of an individual would first energize the mobile identification terminal. The operator would then input his or her security token into the mobile identification terminal, in much the same manner as he or she would in the embodiment of the invention described with respect to FIG. 6 above. The operator would then input a unique identifier for the person to be identified. This unique identifier could be a drivers license, a credit card, or any other identifier that would be unique to an individual. This input would be accomplished using any one of a number input devices on the mobile identification terminal, such as the magnetic strip reader, an optional barcode scanner or the input keypad.

Once the operator inputs the unique identifier into the mobile identification terminal, the terminal will transmit the data to the remote database site using a wireless communications link, which could be a cellular telephone link, radio frequency (RF) or microwave transmission medium, satellite communication links, or the like. Once communications with the remote database site are established, the remote database will perform a security check in much the same way as described with respect to FIG. 6 above. If a match exists between access authority information unit input into the mobile identification terminal matches an access authority unit maintained at the remote database site, then access to the remote database site will be granted. If no match exists, then the remote database site will prompt the operator, via a wireless communication transmission to the mobile identification terminal to reenter his or her access authority information unit.

Once access to the remote database site is granted, then the remote database site will search the database as described earlier and retrieve a biometric or other identification data, which is mapped to the unique identifier input by the operator at the mobile identification terminal. The remote database site will then transmit the biometric or other identification data to the mobile identification terminal via the established communications link. The operator using the mobile identification terminal would then verify the identity of the individual to be identified by comparing the biometric or other identity data displayed on the display means of the mobile identification terminal with physical information presented by the person to be identified locally. If a match exists, then the operator would enter a key stroke sequence to indicate that the individual's identity has been verified and that a match exists. The remote database would then store the identity verification transaction, which would include the identity information of the person to be identified along with the access authority information of the operator of the mobile identification terminal, which it would obtain from the operator's security token. Thus, as described earlier, should a question arise as to the veracity of a particular identity verification transaction, a transaction record could be recovered from the remote database site.

In another embodiment of the basic invention, a retrofit terminal is used to add positive identification capabilities to existing point of sale devices and systems. The retrofit terminal is designed to work in conjunction with existing point of sale devices without the necessity of replacing currently existing retail establishment hardware systems.

The retrofit terminal is added at the existing point of sale and consists of a modified controller, a display means, and a communications interface. Preferably, the display means is a miniature flat panel display, similar to the type used in the point of identification terminal described above. The display can be located on available counter space or, if space is at a premium, it can be mounted on a pedestal or the like. The retrofit terminal would be connected to a standard power source and to the existing credit card authorization hardware via its internal serial or parallel communications interface.

The retrofit terminal would require the use of a modified controller. Instead of accepting the credit card account information from either a magnetic strip reader, a barcode reader, or a manual input, as is the case with the standard point of verification terminal, the retrofit terminal would accept the credit card account information from the existing point-of-sale hardware via its communications interface. The retrofit terminal would then initiate communications to a remote database site in the same manner described earlier in order to retrieve and display identifying data, such as digitized photographs of the authorized credit card users. However, unlike the standard point of identification terminal, identifier accountability would have to be provided using inputs entered by the identifier on the existing point-of-sale hardware, which would be communicated to the retrofit device via the communications interface. The retrofit terminal would then forward the identifier specific information to the remote database site for storage. The retrofit terminal could also include an optional check scanner or an optional bar code reader to allow flexibility of use with other forms of payment such as personal or company checks or the like.

Thus, the retrofit terminal would greatly reduce the cost per identification site, would simplify the installation of hardware at each identification site, and would increase the viability and acceptability of the novel positive identification system.

Multiple remote database storage and retrieval centers would be tied together via a global high speed network 24–26. Data from any of the database centers can be routed to any of the other centers over the network in order to update the databases, provide redundancy of data, emergency backup, load monitoring and transactional balancing.

Because the disclosed invention can be used without alteration of any substantial kind to the present credit card system, as seen from the perspective of a current credit card user, novel methods will be used to develop the digital photographic image database. Alternative methods of developing the database are disclosed in U.S. Pat. No. 5,657,339, issued Aug. 12, 1997 and assigned to the assignee of this invention, which is incorporated herein by reference.

Various changes coming within the spirit of the invention may suggest themselves to those skilled in the art; hence the invention is not limited to the specific embodiment shown or described, but the same is intended to be merely exemplary. It should be understood that numerous other modifications and embodiments can be devised by those skilled in the art that will fall within the spirit and scope of the principles of the invention.

Modifications and substitutions by one of ordinary skill in the art are considered to be within the scope of the present invention which is not to be limited except by the claims which follow.

What is claimed is:

1. A mobile positive identification system comprising:

at least one remote database site having stored therein a database comprising a plurality of access authority information units corresponding to authorized users of the system and a database comprising a plurality of digital photographic images of persons to be identified;

a mobile point of identification terminal having an access authority information unit input for inputting an access authority information unit presented by a user of the system, an identifying information input for accepting identifying information presented by a person to be positively identified at said mobile point of identification terminal and a display device for displaying digital photographic images of persons to be identified;

a communications link, linking said mobile point of identification terminal to said at least one remote database, wherein said communications link is comprised, at least in part, of a wireless communications link;

a means for verifying that said point of identification terminal is authorized to access said remote database site; and a means for verifying that said user of said system has compared the digital photographic images displayed on the display means with the physical appearance of the person being identified at the point of identification terminal and that a match exists between at least one of said digital photographic images and the physical appearance of said person being identified.

2. The system of claim 1, wherein said means for verifying that said point of identification terminal is authorized to access said remote database site comprises a software key included in said point of identification terminal.

3. The system of claim 1, wherein said wireless communications link comprises a wireless transceiver incorporated into said point of identification terminal.

4. The system of claim 1, wherein said wireless communications link is selected from the group consisting of cellular telephone communications links, Radio Frequency (RF) communications links, microwave communications links, or satellite communications links.

5. A method of positively identifying individuals, said method comprising the steps of:

registering a plurality of system users by assigning at least one unique access authority information unit to each of said system users;

storing said assigned access authority information units in a valid system user database at a remote database site;

storing a plurality of digital photographic images of persons to be identified in an identification database as said remote database site, each said stored digital photographic image corresponding to at least one identification information unit;

logging a system user onto the system by inputting at least one access authority information unit assigned to said system user into a point of identification terminal;

accepting an identification information unit presented by a person to be positively identified at said point of identification terminal and inputting said identification information unit into said point of identification terminal;

establishing communications between said point of identification terminal and said remote database over a communications link comprising, at least in part, of a wireless communications link;

verifying that the point of identification terminal is authorized to access said remote database site;

transmitting said access authority information unit input into said point of identification terminal to said remote database site and comparing said access authority information unit with said access authority information units stored in said valid user database;

granting access to said identification database at said remote database site if a match exists between said access authority information unit input into said identification terminal and a valid access authority information unit stored in the valid system user database and said point of identification terminal is verified to be an authorized device;

transmitting said input identification information unit to said remote database site;

retrieving at least one of said digital photographic images corresponding to said identification information unit transmitted to said remote database site;

transmitting at least one of said digital photographic images over said communications link, including said wireless communications link, to said point of identification terminal;

displaying at least one of said digital photographic images received from said remote database site on a display device at said positive identification terminal;

comparing said displayed digital photographic image with the physical appearance of the person being identified at the point of identification terminal;

indicating that the system user has compared the displayed digital photographic images with the physical appearance of the person being identified matches at least one of the displayed digital photographic images by inputting a key stroke sequence into the positive identification terminal; and storing, at the remote database site, a transaction record including identifying information for said person being identified and said system user for recall should a positive identification transaction be questioned at a later date.

6. The method of claim 5, wherein the step of registering said plurality of system users comprises assigning a unique personal identification number to each system user as said unique access authority information unit.

7. The method of claim 5, wherein the step of registering said plurality of system users comprises assigning a unique electronic key to each system user as said unique access information unit, wherein each said electronic key comprises a unique code to be read by said system.

8. The method of claim 7, whereas the step of registering said plurality of system user's further comprises assigning a personal identification number to to each system user in addition to said assigned electronic key.

9. The method of claim 5 further comprising the step of analyzing transactions off-line to identify out of norm patterns in order to identify potentially fraudulent transactions.

* * * * *